(12) United States Patent
Giroti

(10) Patent No.: US 7,369,540 B1
(45) Date of Patent: May 6, 2008

(54) PROGRAMMABLE NETWORK CONVERGENCE EDGE SWITCH

(75) Inventor: Sudhir K. Giroti, Acton, MA (US)

(73) Assignee: Azurn America, Inc., Waltham, MA (US)

( * ) Notice: Subject to any disclaimer, the term of this patent is extended or adjusted under 35 U.S.C. 154(b) by 815 days.

(21) Appl. No.: 10/421,361

(22) Filed: Apr. 23, 2003

Related U.S. Application Data

(60) Provisional application No. 60/374,720, filed on Apr. 23, 2002.

(51) Int. Cl.
   *H04L 12/66* (2006.01)
(52) U.S. Cl. ..................................... 370/352
(58) Field of Classification Search ...................... None
   See application file for complete search history.

(56) References Cited

U.S. PATENT DOCUMENTS

| | | | | |
|---|---|---|---|---|
| 6,522,629 B1 * | 2/2003 | Anderson, Sr. | ............. | 370/236 |
| 7,130,393 B2 * | 10/2006 | Hall et al. | ............... | 379/90.01 |
| 7,139,380 B2 * | 11/2006 | Burger | .................. | 379/207.02 |
| 2002/0176404 A1 * | 11/2002 | Girard | ........................ | 370/352 |

* cited by examiner

*Primary Examiner*—Ramnandan Singh
(74) *Attorney, Agent, or Firm*—Mark Levy; Hinman, Howard & Kattell

(57) ABSTRACT

A programmable network convergence edge-switch (NCES) deployed in the corporate enterprise that enables services delivered by the telecommunication carriers to interoperate and integrated with databases and applications within corporate enterprises. The NCES enables integration of services deployed over Advanced Intelligent Networks (AIN), soft-switches (SS) and Session Initiation Protocol (SIP) switches over one set of interfaces on one end and data deployed over IP network over the other set of interfaces on the other end. Integrating carrier services with enterprise data generates an opportunity to build the next generation of advanced applications and services that transcend beyond a single-network single-protocol to a multi-network multi-protocol environment.

12 Claims, 10 Drawing Sheets

Fig 8: Traditional 800 number call-processing

Fig 9: Enterprise Application 800 number destination request

PROGRAMMABLE NETWORK CONVERGENCE EDGE SWITCH

RELATED APPLICATIONS

This application is a Continuation-in-Part of U.S. Provisional Patent Application Ser. No. 60/374,720 filed Apr. 23, 2002 and claims priority thereto under 35 U.S.C. §119(e) and which is included herein by reference in its entirety.

FIELD OF THE INVENTION

The invention relates to the field of telecommunications and IP networks and, more specifically, to a system that enables integration of telecommunication application services with databases and applications on a data network for delivering next generation of converged network services.

BACKGROUND OF THE INVENTION

Services delivered by the public switched telephone network (PSTN) carriers currently reside within the core of the PSTN network and cannot be integrated with data resident within IP-based private or enterprise networks. Carriers have not been able to expose these services for controlled access until recently through published standards such as JAIN, Parlay APIs and others. These standards offer an opportunity for carriers to provide secure access to network core resources. The present invention relates to a technology (i.e., an intelligent edge-switch) that enables IP based enterprises and data centers to harness the intelligence of the Advanced Intelligent Network (AIN), softswitches, and Session Initiation Protocol (SIP) switches currently resident within the core of the PSTN fabric. This is accomplished by tapping into the intelligence of these devices and systems thereby bringing them virtually closer to the edge of IP networks. These core PSTN services available at the edge can then be integrated with data resident within enterprise networks. This allows development of next generation enhanced voice and data converged services. Such integration of IP data with services resident within the Advanced Intelligence Networks will also enable subscribers to personalize data and network services to create custom services and define their own network environment.

DISCUSSION OF THE RELATED ART

Referring to FIG. 2, there is shown a schematic block diagram illustrating how in the prior art the carrier domain 22 (i.e., the Public Switched Telephone Network (PSTN)) is isolated from the enterprise domain 12. PSTN 22, which is connected to telephones 30 for providing voice services, is disjoint from private or "enterprise" Internet Protocol (IP) networks 12, so that enterprise databases 14 and applications 16 are not integrated with the voice services of the PSTN 20. The data processing devices 18 such as computers cannot access and integrate with core PSTN services 20. Traditionally, there has been functional separation between data networks over which data services have been provided and voice networks over which voice services have been provided. Voice networks such as the public switched telephone network (PSTN) have long employed large monolithic switches optimized to quickly and efficiently create, maintain, and tear down transitory end-to-end voice circuits. Although PSTN voice circuits have been used as transmission paths for computer data through the use of modems, the PSTN itself has not provided any higher-level support for data applications. A telephone, for example, cannot function as a data terminal on which an arbitrary text file can be displayed, nor does the PSTN provide any intelligent infrastructure for carrying out even primitive data-related operations, such as file transfer, e-mail, etc.

Recently, PSTN carriers have deployed new services having data components, but these have been enhancements to the basic voice service, and have been controlled strictly by the carriers. Examples include toll-free dialing (800) service, emergency (911) service, directory assistance (411) service, and more recently services such as call waiting, call forwarding, callback (*69), etc. For example, an enhanced version of toll-free dialing (800) service permits calls to be automatically routed to a particular outlet or franchise of an 800 number owner, based on the location of the caller, time of the day, day of the call and area code.

U.S. Pat. No. 6,542,598 for ADVANCED INTELLIGENT SIGNAL TELEPHONE NUMBER ROUTING issued Apr. 1, 2003 to Harold C. Fleischer, III et al. describes one such enhanced service that describes intelligent telephone number routing. These services provide value by enabling subscribers to exert more control over their use of the voice services provided to them by carriers.

PSTN carriers have deployed Advanced Intelligent Networks (AINs) to avoid dependency upon switch vendors for new revenue generating enhanced services for differentiated offerings. As illustrated in FIG. 6 (prior art), AIN separated the service logic 45 from the switching hardware 37 enabling carriers to create and provision services 47 without relying on equipment makers. AIN has enabled the telecom carriers to breakaway from the monolithic central office (CO) switches such as Lucent 5ESS or Nortel's DNS line with bundled call control, switching and pre-built services in a single unit. Instead, they have moved to an unbundled environment where services could be rapidly developed and deployed outside the CO over the AIN network while control and signaling was retained within the CO switches. This scheme has solved the biggest problem that plagued the carriers, that of service provisioning. Prior to AIN, innovation was curbed because carriers could not implement their own services and instead had to go to each equipment vendor to create and provision services resulting in delays and expensive rollouts.

U.S. Pat. No. 6,009,430 for METHOD AND SYSTEM FOR PROVISIONING DATABASES IN AN ADVANCED INTELLIGENT NETWORK issued Dec. 28, 1999 to Rayappu F. Joseph et al. describes systems for provisioning databases in an AIN. The use of AIN initiatives has resulted in services being developed and deployed separately from the switching fabric. However, true compatibility with AIN could not be engineered because the AIN switches had to support legacy equipment. Given the disparity between different vendor's switches it turned out to be harder task than expected. As a result each vendor built their own version of the AIN-compatible central office (AIN CO) switch that was incompatible with every other vendor's AIN CO switch in the market.

The fundamental limitation of the PSTN is that although it is capable of providing enhanced voice services to subscribers, it still provides no support for data services. A subscriber can access a directory by dialing 411 and hear a synthesized vocalization of another subscriber's telephone number, but cannot have the other subscriber's name, number and other information appear on a display of the telephone that can be saved by the phone or sent to a text file to another caller. As illustrated in FIG. 3, the data manipulation functions within the services network 42 are part of voice-related services that are delivered only in voice form via the circuit-switched network 22. Call receiving and routing functions of the circuit-switched network 22 are integrated only with the carrier-controlled services network 42. Accordingly, the PSTN has not been capable of providing enhanced, integrated voice and data services, especially services from third parties, to PSTN subscribers. However, the AIN network remains a part of the carrier network and is not designed to be integrated with content in the corporate enterprise networks. This fact motivates the present invention.

Softswitch, also known as a media gateway controller or sometimes as a call agent, is a natural evolution and the next generation of the AIN framework that overcomes the fallacy tethering AIN to the vendor equipment. A softswitch is a software-based switching and control solution that is designed to be hardware independent. Softswitches run on industry-standard operating platforms to deliver the functionality of a traditional telephone CO switch with AIN capability. Unlike traditional CO switches that supports only voice, softswitches can integrate voice, data, fax and video. Also, unlike the traditional CO switches that supports one signaling protocol (SS7, etc.) between CO's, softswitches support multiple signaling protocols (SS7, MGCP, IP, SIP, etc.) as well as independent networks (e.g., wireless and broadband). Network operators are deploying softswitches to effectively differentiate their service offerings by delivering the next generation of enhanced services. As a matter of economics, only services having very wide appeal will likely be deployed, even within the softswitch-enhanced PSTN. Even with the deployment of softswitches, there still is disjointedness between the PSTN and the enterprise networks as the softswitches cannot penetrate private packet enterprise networks. For this reason, softswitches cannot tap into the myriad of applications and services having smaller numbers of potential subscribers.

With voice being their primary commodity, carriers are spending R&D resources in delivering differentiated enhanced services in the areas of (a) end-user calling services such as Personal number, voice dialing, find-me, conferencing; (b) provider services such as account inquiry, customer activation; (c) messaging services such as unified messaging, short messaging service; and (d) content services such as interactive voice response system, announcement, language interpretation, content delivery by customer profile and others. These services are delivered by the carrier from within the core of their infrastructure and are available to subscribers. Some of these services—such as account inquiry, find-me can be provisioned or programmed by subscribers either by calling a customer service representative at the carrier or electronically by connecting to the carrier's provisioning portal through a web browser. In either case, the service can be provisioned by end-users but it cannot be integrated with content resident in the corporate enterprise networks. FIG. 7 illustrates an internal block diagram of a softswitch. The media gateway 118 is the interface between PSTN voice and IP data networks. The media gateway controller 114 provides call control by providing service access, routing signaling messages and managing the network availability. The signaling gateway 116 translates the telephone signaling messages to go over data networks. The Service management platform 110 manages customer database 112 and billing.

Both AIN and softswitches enable telecommunication carriers to offer applications and services that have typically suited mass markets. Niche and short lived applications have traditionally been financially unfeasible as network operators cannot justify massive efforts and costs for such low usage and ephemeral applications. Java APIs for Integrated Networks (JAIN) and Parlay Application Programming Interface (Parlay API)—two industry efforts, enable parties operating outside the security domain of the network operators to build applications that rely on real-time control of network resources within a carrier's networks. Java is a language developed by Sun Microsystems, Palo Alto, Calif. and Parlay is a multi-vendor industry forum formed by a group of companies (www.parlay.org). Through a set of Application Programming Interfaces (APIs), network operators can provide standardized access to third parties who are operating outside of their trusted space to access and control core network resources.

Techniques in the area of computer-telephony integration enable some level of integration of a telephony connection with enterprise data, but not with the AIN. Additionally, such integration is possible only after the number has been translated and terminated to a destination number and not during the determination of the destination number by the AIN. The present invention differs from the general-purpose computer telephony integration technologies by tapping directly into the AIN and soft-switch intelligence to fundamentally achieve altered behavior from the service executing on the AIN or soft-switch, thereby effectively personalizing application execution.

Even with next generation networks (NGNs), whether they are IP based or ATM based, corporate enterprises must deploy an embodiment of the present invention that delivers control to the corporate enterprise when interacting with the telephone carrier infrastructure.

SUMMARY OF THE INVENTION

In accordance with the present invention there is provided a programmable network convergence edge-switch (NCES) deployed in the corporate enterprise that enables services delivered by the telecommunication carriers to interoperate and integrated with databases and applications within corporate enterprises. The NCES enables integration of services deployed over Advanced Intelligent Networks (AIN) softswitches and session initiation protocol (SIP) switches over one set of interfaces on one end and data deployed over IP network over the other set of interfaces on the other end. Integrating carrier services with enterprise data generates an opportunity to build the next generation of advanced applications and services that transcend beyond a single-network single-protocol to a multi-network multi-protocol environment.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention features a programmable switch, particularly a network convergence edge-switch (NCES) which is placed at the "edge" of a traditional IP network and which provides connectivity to carrier networks using an internal set of network interfaces and protocol stacks.

Figure 1:
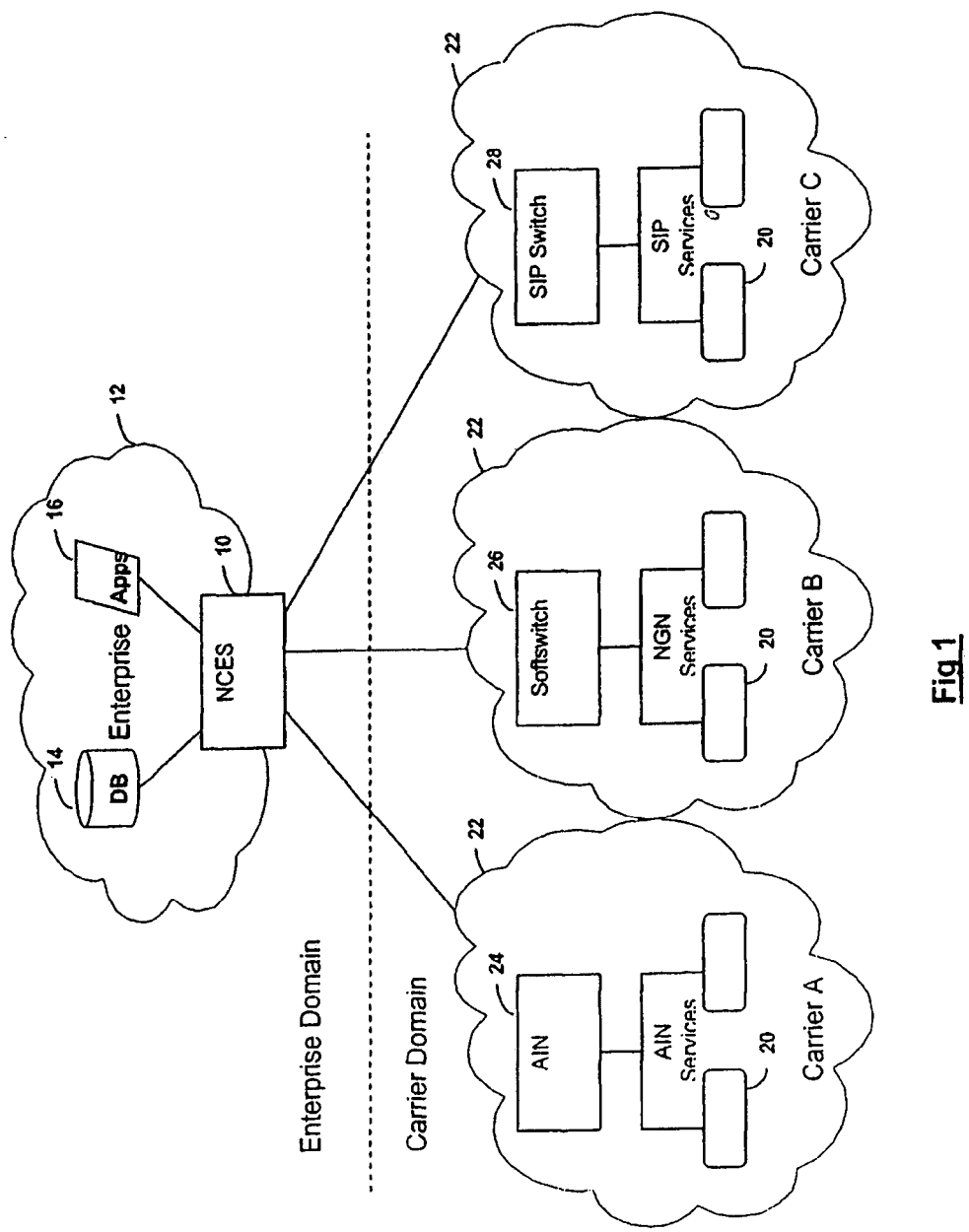
FIG. 1 is an environmental schematic block diagram of the NCES of the present invention deployed at the edge of an Enterprise network interacting with switches in the carrier domain.
Figure 2:
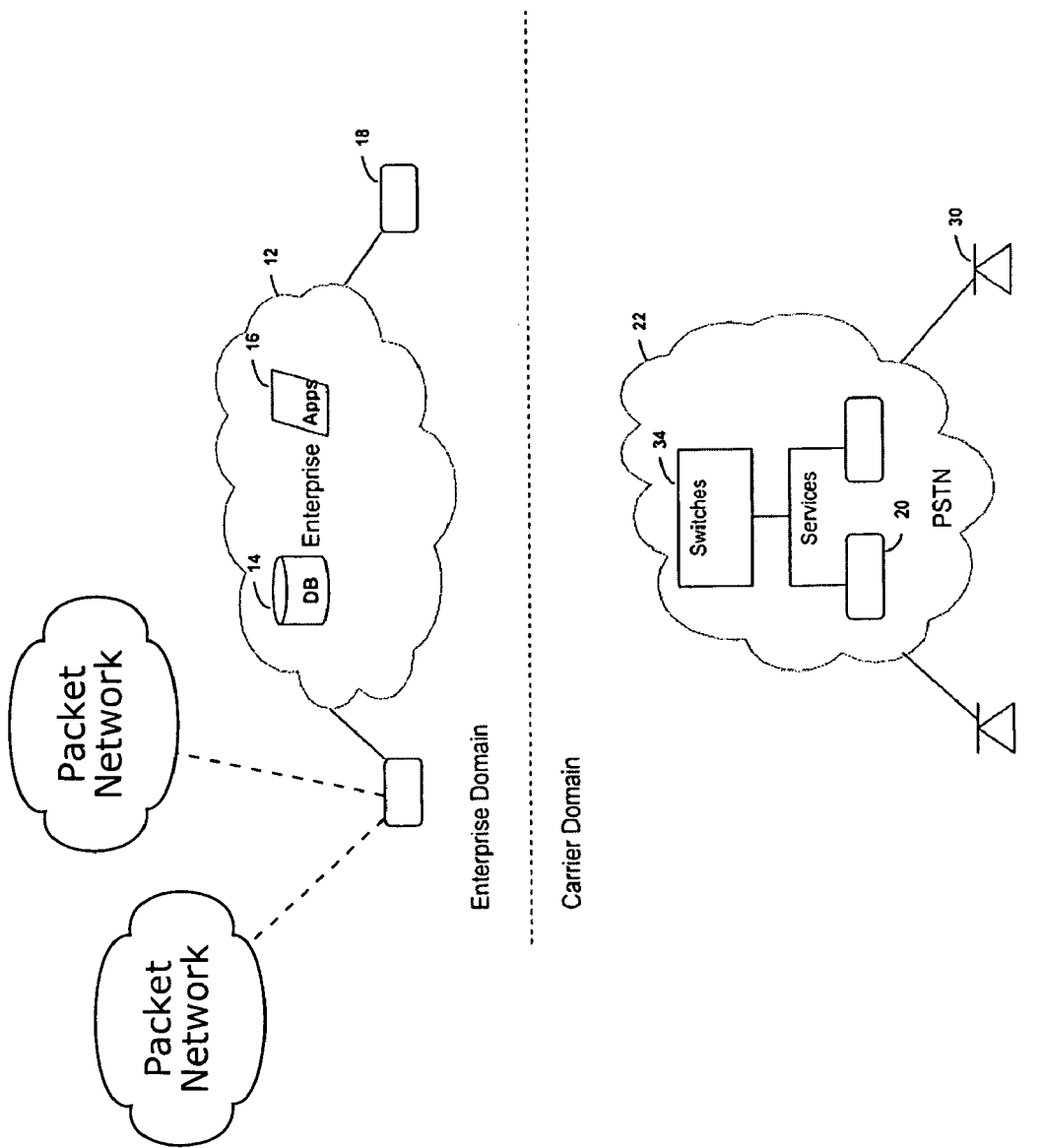
FIG. 2 is a schematic block diagram depicting the functional separation between the PSTN and enterprise networks as it exists in the prior art.

Referring first to FIG. 1, there is shown an environmental schematic block diagram of the NCES 10 of the present invention disposed in an enterprise IP network 12 and connected to several carrier domains 22. Enterprise domain 12 contains both application programs (Apps) 16 and databases (DB) 14. Carrier domains 22 contains a switch such as AIN 24, softswitches 26, or SIP switches 26. Each switch 24, 26 28 supports a variety of services, represented schematically at reference no. 20.

The NCES 10 of the present invention is capable of providing the network application convergence between one or more carriers and an enterprise IP network only if the carrier has decided to expose its services for general purpose and third party usage. Without appropriate security privileges an enterprise, or for that matter the NCES, is not capable of interacting with carrier switches 24, 26, 28 and services 20. In order for the carriers to "enable" their networks for third party application development, each carrier would need to integrate with a set of commonly available and industry prescribed software upgrades such as those specified by Java API for Intelligent Networks (JAIN) from Sun Microsystems of Palo Alto, Calif., and Parlay X or Open Service Architecture Application Programming Interface (OSA/API) from the Parlay Group, an industry consortium that specifies a Parlay API Interfaces. Java, JAIN and Parlay are believed to be well know to those of skill in the networking and telecommunications arts and will not be further described herein. These APIs operate within the framework of the existing carrier infrastructure and require minimal upgrades compared to the alternative of making all equipment obsolete. Once enabled, an enterprise can deploy the NCES 10 of the present invention at the edge of their enterprise network and in data centers on an IP backbone. This allows the enterprise to build and deploy highly interactive applications and services integrated with carrier AIN, softswitch and SIP switch based services, thereby linking these services with enterprise data and applications.

In alternate embodiments, the concepts of the present invention can also be implemented in software within an enterprise on general purpose and commonly available computers. In software implementations, the throughput may be lower than what is achieved through a combination of specialized hardware and software as defined within the NCES 10 of the preferred embodiment.

Figure 3:
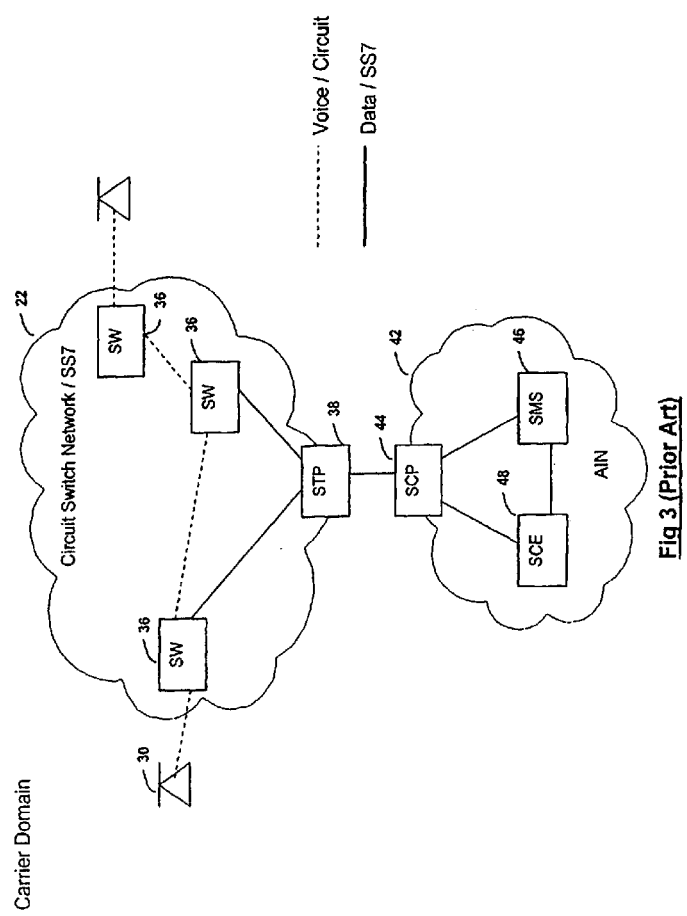
FIG. 3 is a schematic block diagram of pertinent parts of the PSTN of FIG. 2 with the AIN switches.

The NCES 10 of the present invention operates with AINs, softswitches and SIP Switches. FIG. 3 is a schematic block diagram showing an AIN 42 resident within the core of the Public Switched Telephone Network (PSTN) 22 and is used in connection with the present invention. FIG. 3 also shows the structure of the Common Channel Signaling/Signaling System Number 7 network (CCS/SS7) that supports services 20 (FIG. 1). These services include enhanced 800, 911, call-forwarding, and *69, etc. The basic circuit switching of voice circuits is carried out in a circuit-switched network 22. Circuit-switched network 22 consists largely of a number of interconnected circuit switches or central office (CO) switches 36 that are capable of creating end-to-end circuits that connect telephones 30. The SS7 network 22 is separate from the circuit switching voice network and is used to switch data messages between switches related to the business of connecting telephone calls and maintaining the signaling network. A CO switch 36 is typically operated by a local exchange (LEC) while connection between various exchanges is operated by inter exchange carriers (IXC). A Signal Transfer Point (STP) 38 gets SS7 signaling messages from a CO switch 36 for routing it to another CO switch 36 or to the AIN 42. AIN 42 includes at least one service control points (SCP) 44, a service management system (SMS) 46 and a service creation environment (SCE) 48. SCE 48 enables development of enhanced services. The SCP 44 serves as an interface to telephone company databases and repositories. Databases are typically connected to the SCP via x.25 links. Therefore, an SCP 44 can perform protocol conversion from the SS7 to X.25. SCP 44 also includes the application intelligence and call-processing logic. The SCP 44 can store information about subscribers' services, 800 routing, and AIN services such as Enhanced 800 call-processing. The SCP 44 queries its database through a set of primitives (i.e., commands) via a protocol called transmission control application part (TCAP). The SMS 46 operates, manages and administers (OA&M) the SCPs 44. An AIN compatible component to of CO switch 36 also known as a service switching point (SSP) interacts with a plurality of SCPs 44 in the AIN through a set of signaling transfer points (STPs) 38. Message communication between AIN-compatible CO switch 36 and SCP 44 is over the CCS/SS7 network 22. An SSP "connects" and routes telephone calls between the calling station (telephone) and the called party station (telephone) 30. While the AIN requires AIN-compatible SSP switches, a non-AIN compatible CO switch can also provide a subset of AIN like features as disclosed in U.S. Pat. No. 6,226,373 for INTELLIGENT SERVICE PERIPHERAL/INTELLIGENT PERIPHERAL issued May 1, 2001 to Yao T Zhu et al.

Figure 4:
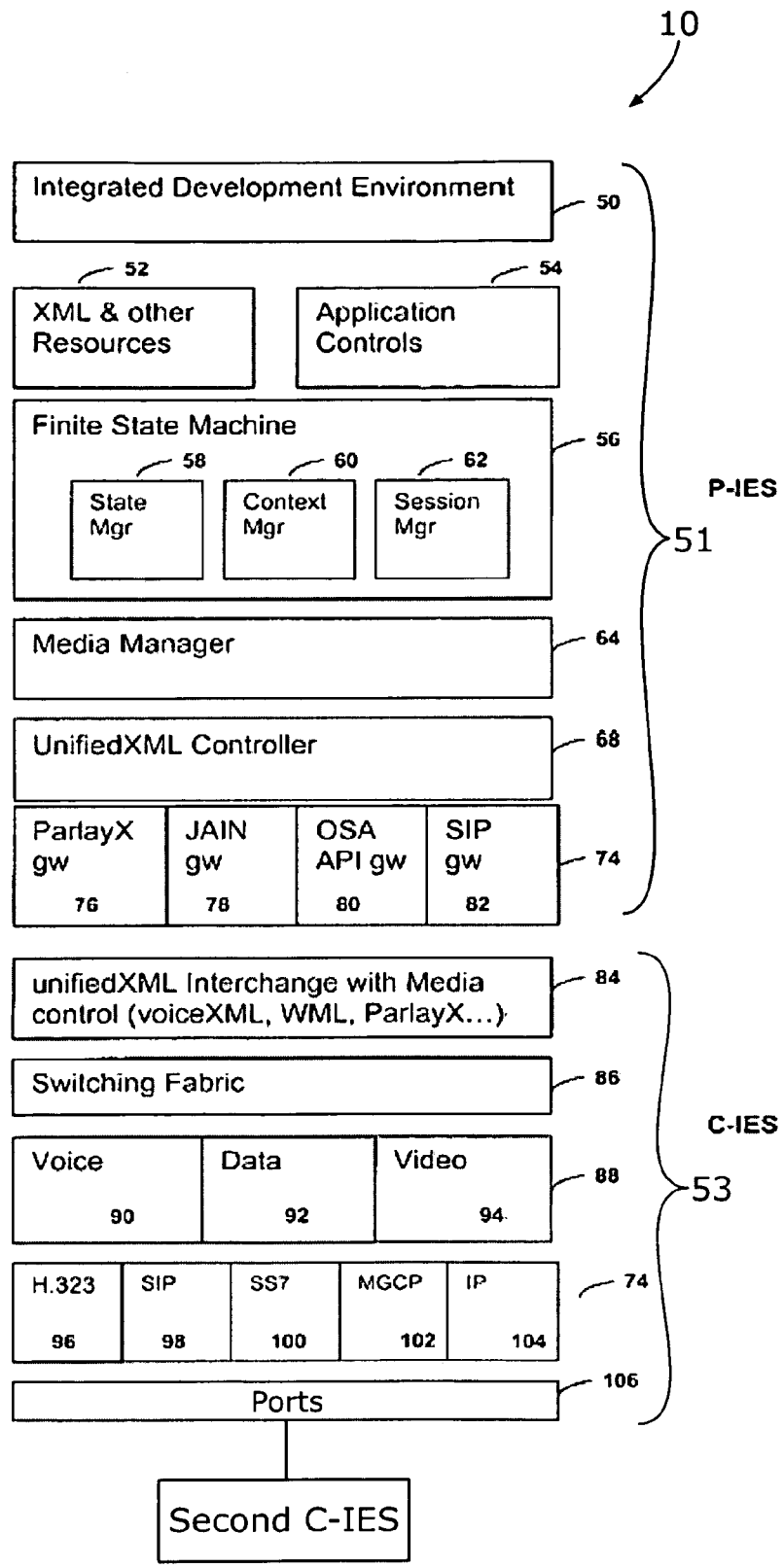
FIG. 4 is a schematic diagram illustrating the components and architecture of the NCES as shown in FIG. 1.

Referring now to FIG. 4, there is shown a schematic block diagram of the architecture components of the NCES 2 of the invention. The NCES 2 consists of two components: (a) a private-integrated edge switch (P-IES) 51 that provides the connectivity with the enterprise resources and application developmental capability and (b) a carrier-integrated edge switch (C-IES) 53 that provides the protocol negotiation and enterprise application proxy for the carrier network. P-IES 51 consists of a point-and-click integrated application development environment (IDE) 50 and enables interactivity with databases, not shown, and applications, not shown. The development manager within development environment 50 interacts with both static and dynamic XML resources 52 that may be accessed during runtime. Dynamic XML resource 52 may be created in real time from physical data or generated data. Runtime is identified to be the engine that is activated in real-time during application execution. The development environment 50 toolkit includes a signaling part and a media handling part. The signaling part is made up of several signaling protocols such as SS7, MGCP, SIP and IP. The protocol API's are included as libraries in IDE 50. These, for example, are JAIN SIP stack libraries, OSA API libraries, ParlayX APIs and the JAIN interface libraries, etc. It will be recognized that other libraries, APIs, as well as other object may also be included. Consequently, the invention is not considered limited to those object chosen for purposes of disclosure. It will also be recognized that because of some of possible the overlap in the JAIN, Parlay, and OSA there are some initiatives in place resulting in convergence of all these standards to create a single Application Programming Interface. For example to connect to a carrier SIP switch via SIP proxy on the NCES 10, a developer needs to include the JAIN SIP stack, transaction, login and session APIs to facilitate a transaction through the SIP signaling stack 98.

The outcome of the development process is an Application specific finite state machine (FSM) 56. A FSM constitutes a set of states that an application can have and conditions under which a transition from one state to another is allowed. Once an application is developed and, therefore, a application FSM template is created, the template is loaded in real time during deployment phase. The IDE 50 also creates application controls 54 constituting the application workflow and business logic and that are accessed by FSM 56 during runtime. FSM 56 contains a state manager 58, a context manager 60 and a session manager 62. The state manager 58 manages the state of the session. A session is a series of interactions between a client and a server or two end points to process a transaction within a span of a single connection. Each session has a unique session ID within the scope of the FSM instance or a service instance. A context is considered a composition of relevant data elements that are accrued as a transaction traverses from state to state. A media manager 64 manages the various media streams that the NCES 10 interacts with in the context of the application FSM 56. It communicates with a UnifiedXML controller 68 and eventually with a UnifiedXML Interchange and Media control unit 84. The built-in media controller within media manager 64 aids the media manager 64 in controlling the inbound and outbound streams. The UnifiedXML controller 68 is responsible for sending and receiving XML content in a way that both inbound and outbound streams interoperate within the context of an application FSM 56.

The C-IES 53 can be configured as an AIN, softswitch or a SIP switch compatible gateway to support different carrier equipment and infrastructures. For marketing reasons, gateways may be mixed and matched or integrated within one P-IES switch. Each gateway supports a number of carrier compatible API's 74 such as Parlay 76, JAIN 78, OSA API 80 or SIP Proxy 82. Many of these standards are themselves undergoing "convergence" which it is believed will eventually result in a standard set of APIs. The anticipated APIs may then be used generically for any carrier interactivity. While many possible APIs may be used in conjunction with the NCES 10 of the invention, the Parlay gateway is used for purposes of illustration and disclosure. The invention, however, is not considered limited to a Parlay gateway implementation. The UnifiedXML 84 enables various XML constructions (e.g., voiceXML, WML, HTML, CHTML, ParlayX and other versions) to interoperate within the control of the UnifiedXML controller 68. A user with a computer terminal delivering HTML and a phone with a voiceXML browser could interoperate through the UnfieidXML Controller. None of the XML DTD schemas need to be altered or adjusted in order for these XMLs to interoperate as long as they are integrated within the UnifiedXML bus. The Media controller within the UnifiedXML interchange performs media mixing and sends the outgoing streams to the various participants using appropriate IETF protocols. For example, if audio is to be sent it is sent as an RTP (real time protocol) stream or if interactive voice commands are to be sent, they are sent as a VoiceXML stream or HTML stream in case of a browser. The Switching fabric 86 switches between the different media 88 streams of Voice 90, Data 92 and Video 94. The switching fabric 86 is a combination of hardware and software and allows for the switching paths amongst these ports to be controlled. The switching fabric 86 is high-speed, non-blocking and switched serial packet network that allows for asynchronous operation. Although internal to the C-IES 53, it interacts with CompactPCI packet Switching Backplane (cPSB) standard that is developed by the PCI Industrial Computer Manufacturer Group and other emerging standards such as the one developed by Intel. The standard architecture considers each cPCI board as a standalone processing node or blade that communicates via Ethernet with other boards at speeds of 1 Gb and higher. Multiple Voice and Data ports can therefore be "invoked" with C-IES 53 switching fabric 86. The C-IES 53 comprises at least one or more of the protocol stacks 74 identified as H.323 96, SIP 98, SS7 100, MGCP 102, IP 104, and others. At the physical layer there is a set of ports 106 that supports connectivity with various Internet and Telephony networking protocols such as TCP/IP, POTS, T1, E1, ISDN, DSL, XDSL and ADSL.

The P-IES 51 and C-IES 53 communicate using MEGACO/H.248 protocol (http://www.ietf.org/html.charters/megaco-charter.html). MEGACO RFC 3015 was developed by the Megaco Working Group in cooperation with ITU-T study group 16. The P-IES 51 manages media connections, user sessions and carrier interactivity through the C-IES 53. The P-IES 51 and C-IES 53 interact through Megaco commands and enhanced proprietary commands to support disparate XML DTDs. These commands provide control at the finest level of granularity. These commands from the P-IES 51 result in C-IES 53 acting as a responder. The NCES 10 supports the standard Add, Modify, Subtract, Move, AuditValue, AuditCapabilities, Notify and Service-Change commands. The proprietary commands, on the other hand result, in application specific transaction to be initiated. Some of these are described by the developer. Examples of these are: xxxInitialize, xxxIssue, xxxResend, xxxRewind, xxxException where xxx is an application subsystem identifier.

The IDE 50 provides the means to create application interaction from the User Interface. The mechanisms and libraries included in the development are dictated by the capacity of the carrier switches. For instance, if a carrier that is exposing it's network resources for development of applications through JAIN API then the IDE would include appropriate client side JAIN APIs.

Figure 5:
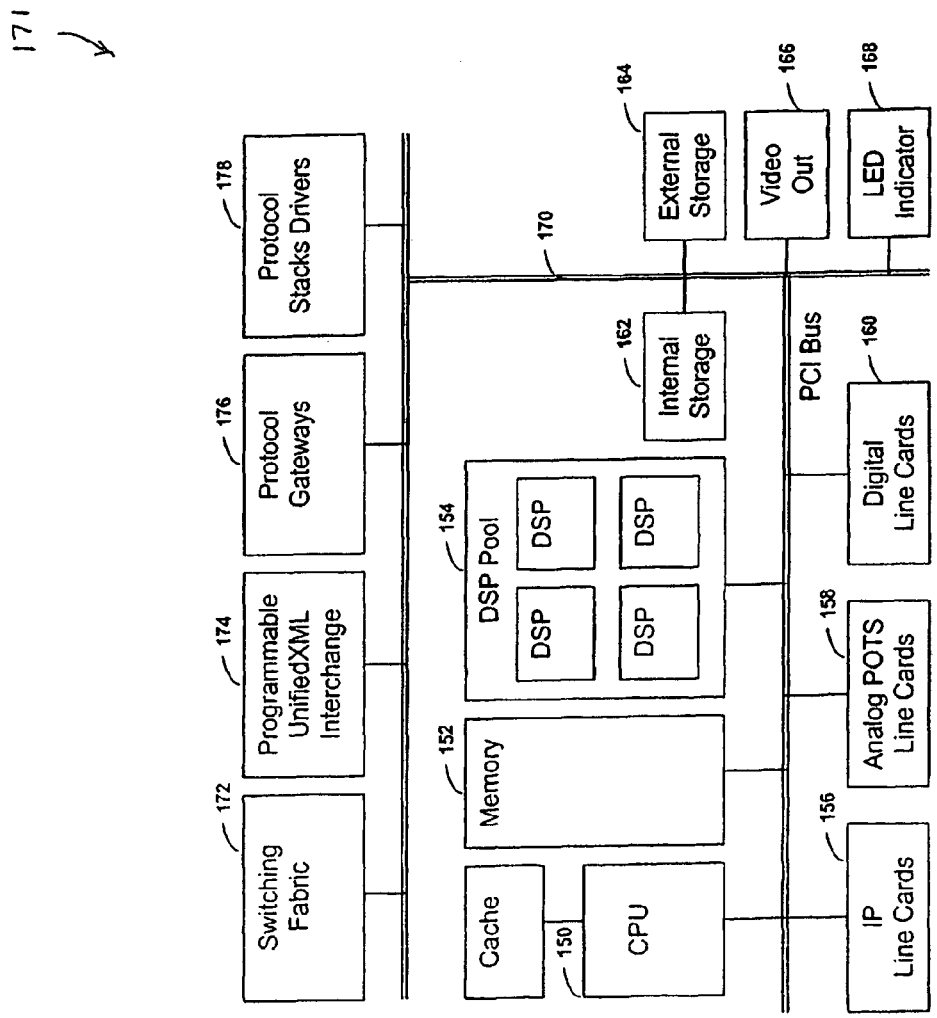
FIG. 5 is a schematic diagram the C-IES internal switch components.
Figure 6:
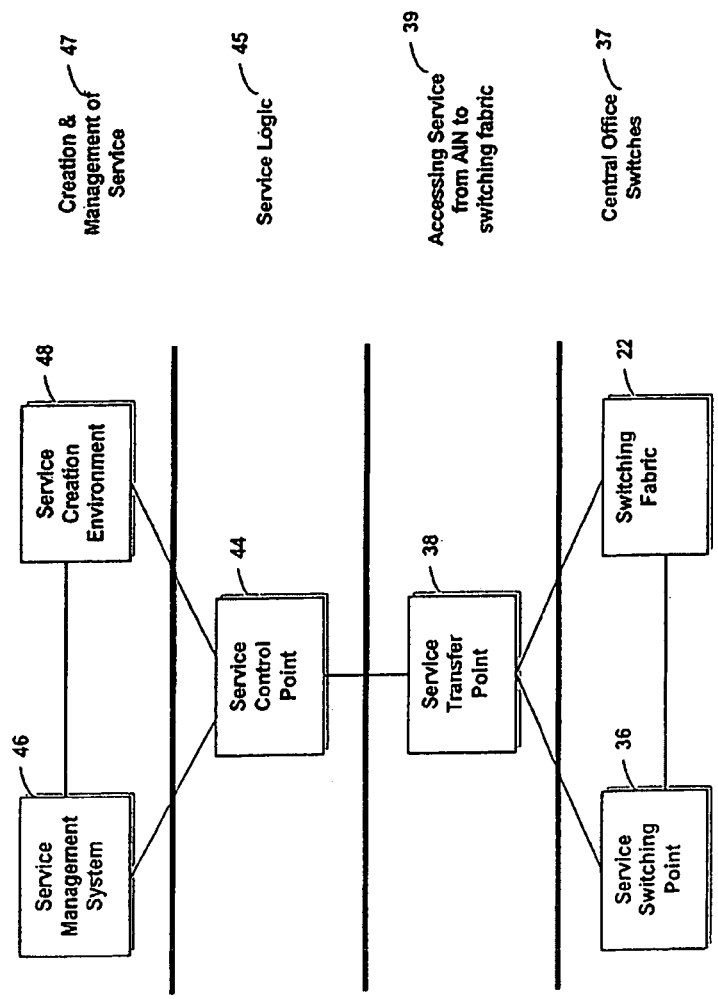
FIG. 6 is a schematic block diagram of the AIN showing functional separation between switches.
Figure 7:
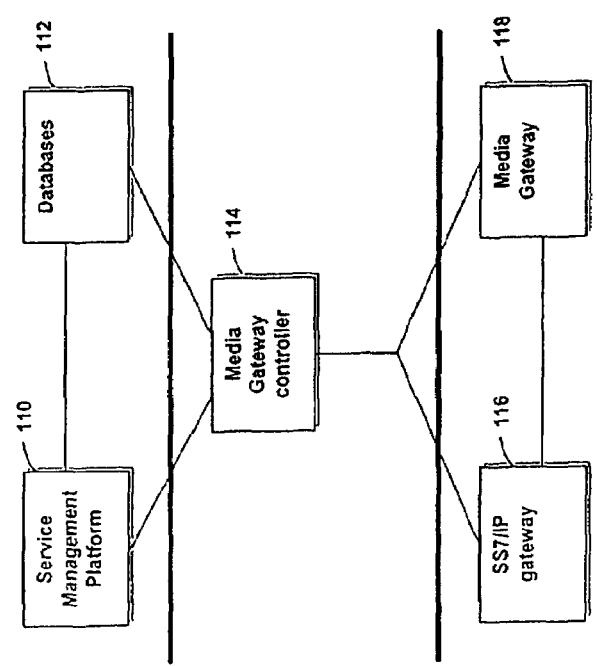
FIG. 7 is a schematic block diagram of softswitch components, their interaction and their functional separation.

FIG. 5 is a schematic block diagram that illustrates the internal components of the switch 171. Switch 171 includes a set of line cards for IP 156, "Plain Old Telephone System" (POTS) 158 and Digital telephony interfaces 160 (e.g., T1, E1, DSL, xDSL, ADSL). Switch 171 also includes a CPU 150 with internal cache, internal memory 152, a pool of DSP's 154 for processing streams from the line cards, and configuring IVR and VoIP capability. Switch 171 includes internal storage 162, external removable storage 144, video out 166 and LED indicators 168. There is also software, not shown, embedded in the hardware. A switching fabric 172 that switches user sessions, a programmable unified interchange 174, protocol gateways 176 and protocol stack drivers 178 for signaling and data are also included in switch 171. The functionality of switch 171 may be upgraded by upgrading the embedded software.

Figure 8:
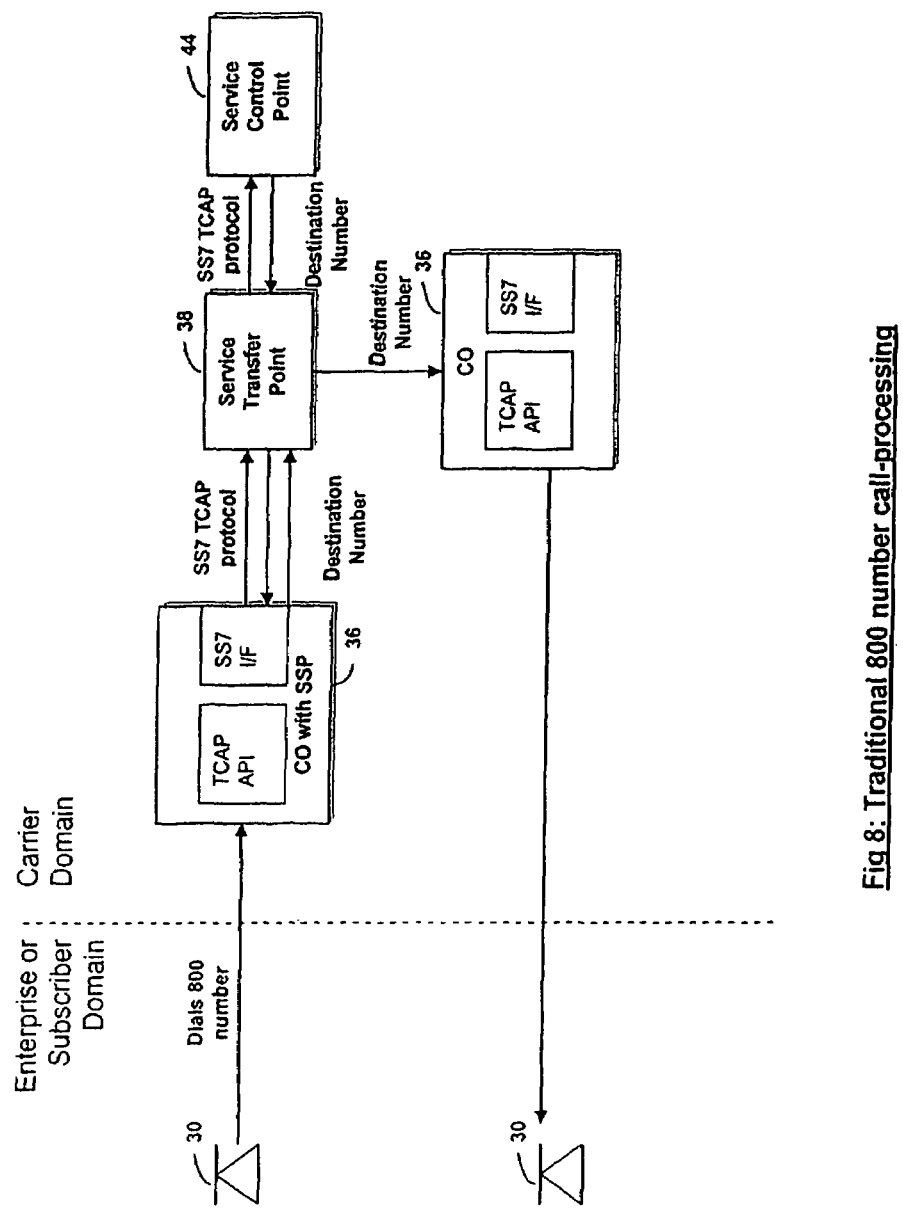
FIG. 8 is a schematic block diagram of a traditional 800 number call-processing routing and switching arrangement of the prior art.
Figure 9:
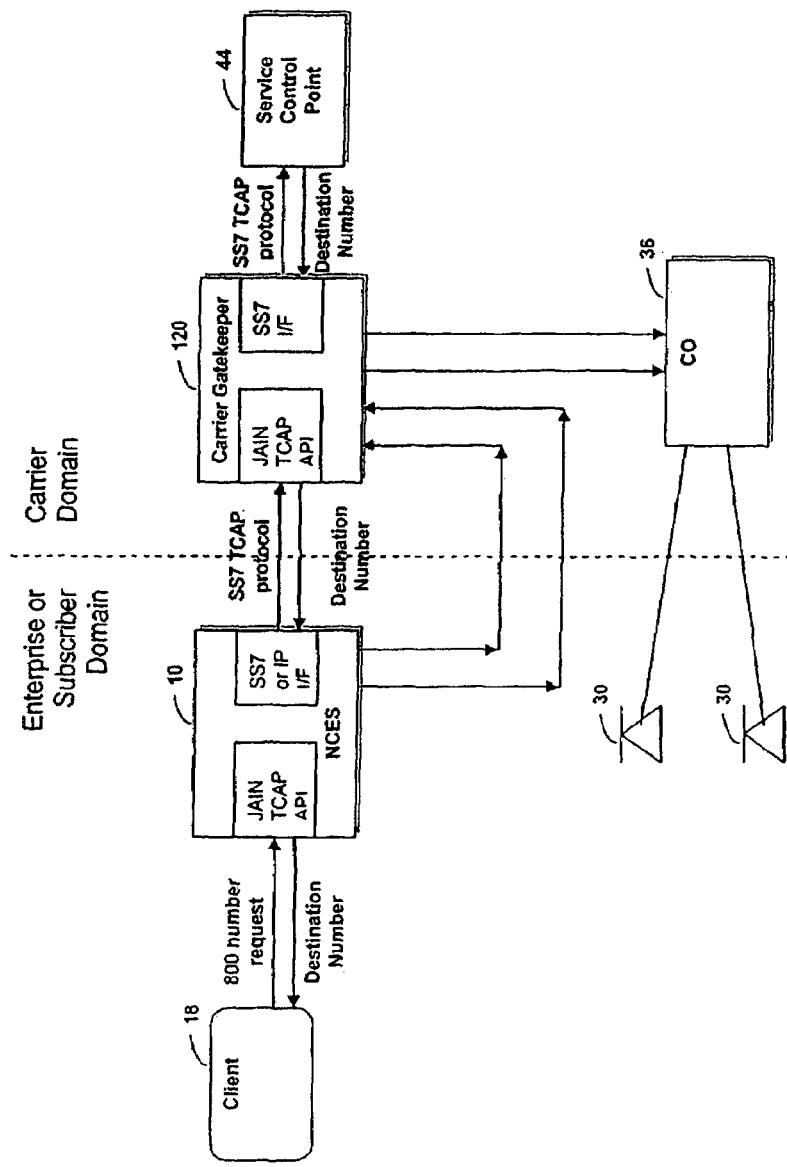
FIG. 9 is a schematic block diagram 800 number call-processing routing and switching arrangement wherein the request is made from a client side PC and application.

FIGS. 8 and 9 are schematic block diagrams illustrating a request for 800 number switching from a traditional phone and a client side application running on a computer, respectively. In the system depicted in FIG. 8, a user dials an 800 number of a business. The call is received at the Central Office or End Office 36. The CO composes a TCAP (Transmission control Application Part) message and signals the STP 38 to receive a request for delivery to the SCP 44. The SCP 44 receives the request, decomposes the TCAP message header and body. The SCP 44 extracts the details from the call that includes: time of day, day of the call, LATA, DNIS, area code, NPR blocking information and other filter criteria relevant to the call-processing logic. SCP 44 then formulates the database query and issues it to the 800 number database via X.25 links. The database responds with a destination number. The SCP 44 returns the Destination Number to the STP which hands it over to the End Office/SSP. The CO either sends it to another CO for connection or if the number is within the local exchange it creates a dedicated circuit switch with that number to complete the circuit. The entire process from dialing the number to connecting the parties takes a few seconds.

Figure 10:
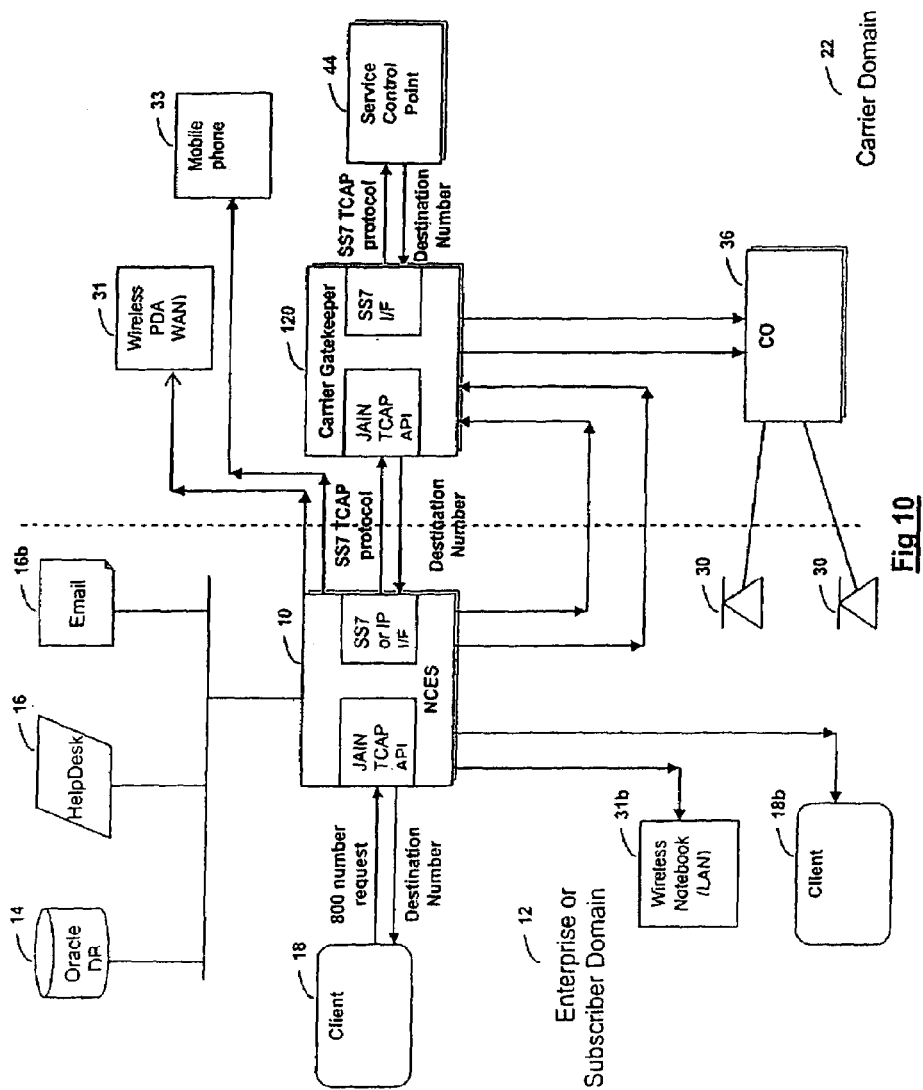
FIG. 10 is a schematic block diagram with capability of FIG. 9 and connectivity with enterprise applications.

FIG. 9 illustrates a system wherein, as opposed to a phone dialing an "800" number as in FIG. 8, a client application requests an 800 number translation from the SCP 44 within the AIN in the carrier network. Upon receiving the "800 number" translation for the first party, the client application invokes a phone call without any sophisticated hardware at one's location by requesting the carrier switch to initiate the first call. If the call is connected it requests the carrier to connect the second call thereby bringing both the parties on line. To make the example more interesting, interactivity with two applications, a database, notebook or a tablet computer connected via wireless LAN, a personal digital assistant connected via wireless WAN and a mobile phone 33 in now introduced. This interactivity is illustrated in FIG. 10. Applications/elements/devices to be "converged" include:

(a) an Email 16*b* such as Microsoft Exchange or Linux Email or something similar;

(b) a help desk application 16 with trouble ticketing data such as Peoplesoft Helpdesk or Remedy help desk;

(c) a database 14 such as Oracle from Oracle Corporation, Redwood Shores, Calif. or MS SQL Server from Microsoft Corporation, Redmond, Wash. or DB2 from IBM Corporation etc., to access product inventory;

(d) a personal digital assistant such as Blackberry, Palm or Pocket PCs connected to a wireless WAN 31 over 9.6 Kbps, 128 Kbps or higher bandwidth and a notebook or tablet PC connected via wireless LAN (say 802.11x);

(e) and a mobile phone over which SMS message will be sent.

It will be recognized that connectivity with an enterprise application is not limited to these two applications, the devices, or the databases chosen for purposes of disclosure. Rather, the inventive process and NCES 10 may be extended to a vast range of applications, devices and databases or other data structures. However, the chosen applications, devices and databases represent typical elements found in today's enterprises. To demonstrate database and application interactivity with the 800 number translation an application scenario is created that may or may not be an instance of a real world application but demonstrates the integration that provided by the present invention.

Consider a special customer service (SCS) application required by company X that needs to tap into the existing Enhanced 800 database from the carrier as the E800 number includes the company's call-processing logic. The 800 number is operational and is used by the company X customers to remember one 800 number which they can call from anywhere. Depending upon the caller's location, time of day, day of the call, the call is routed to the appropriate destination. This is similar to the example described in FIGS. 8 and 9. In this specific scenario under consideration, the SCS application is invoked for special customers only to deliver premier service and can be initiated automatically or in this case the Company X's Sales Rep (SR) or customer support manager (CSM). The SR or CSM, would initiate the SCS application upon determining that the customer needs immediate support and needs to be helped instantly. From where the customer is, he has called the general purpose 800 number but is reaching nowhere. It is clear that calling the 800 number directly will not get him a live support technician in relevant timeframe. So by default the customer calls his SR or the CSM. The SR or the CSM starts the SCS. The SCS application initiates the request to get the E-800 call-processing application at the carrier to return any destination number that is open and available. The carrier switch returns the destination number of the nearest and open technical support center. The SCS application initiates a call to that number and attempts to connect to a technical support personnel. The call is put in a queue even at the remote customer service center. The customer is anxious and excuses him-self as he has to attend to the business crisis and hangs the phone with instructions that he be contacted upon reaching a live technical support personnel with expertise in the area where he needs help. The customer has instructed that he is away from his desk in the back office but is carrying his mobile phone. Although the coverage in the back-office is very erratic, he is certain that he can receive SMS messages. He instructs the company X rep to contact him immediately via mobile phone or else he be contacted via SMS as soon as he gets the technical support representative. He is looking for a specific resolution to a problem he had encountered last year that brought his system down and that it was in the help desk database at the Company X. Also, he wanted to get an email with the license key to his product subscription as he had lost it and needed to enter that upon rebooting the machine. Plus he was looking for a specific computer card that seems to have burned and was desperate to make a decision on buying a replacement based upon the status of the inventory. Furthermore, he had to leave in a couple of hours and wanted to get the product pricing and shipping information pushed on his wireless PDA as he driven home.

FIG. 10 illustrates the scenario depicted above. Within the context of the above scenario, this example will demonstrate how the NCES 10 interacts with the databases 14 and applications 16-16*b* in the enterprise domain and carrier resources such as the gatekeeper 120 and SCP 44 in the carrier domain. Also, the NCES 10 interacts with end user device such as client computers 18, notebook computes 31*b*, wireless personal digital assistants 31 and mobile phones 33.

As a precursor to accessing any service from the network operator, a client side (client X) must first have a contract with the service provider who is providing access to the service and must have all the credentials to enable secure access to carrier resources. Assuming that these are in place, the client must first discover the service. Reason for this is that network operators and carriers will roll out new services for enterprise usage. These services will have to be discovered. This analogy is similar to many of the existing conventions in distributing computing paradigms where a name server (for example a X.500 CDS name space in OSF DCE or JMS in J2EE) is polled for the location of the existing service or interface. In this instance of the operator provided services, the client polls the carrier's name-server known as the framework service discovery (FSD) for service discovery along with the framework's access interface (FAI). In this scenario the it is assumed that the NCES 10 implements Parlay 4.0 specification as a Parlay Gateway 76 as illustrated in FIG. 4. Some of the commands or the interfaces specified in the Parlay 4.0 specification have already been implemented in the Parlay gateway. So, in the scenario depicted in FIG. 10 above, the SR needs to initiate the SCS application. The FSM as illustrated in FIG. 4 starts and is instantiated. The Service Rep opens up the client machine 18 and starts the SCS application. After authentication and proper login, he is allowed to start the application. As a precursor to interacting with the network operator's service, both the client and the carrier have to execute the service agreement or a contract. During application connectivity, the client application invokes a method acs_initiateSignServiceAgreement( ) followed by acs_signServiceAgreement( ) in the acs_IpServiceAgreeement management interface. This process results in a service request to be made to the framework to sign the agreement before the client can execute and use the service. If the SCS is an always running application, a few of the early steps of connectivity and protocol negotiation with the carrier could already have occurred. For the sake of completeness these steps are described as below:

Step 1: To get to the FSD, the client 18 initiates the Parlay Gateway 76 on the NCES 10 to invokes a method acs_obtainInterface( ). The Parlay gateway 76 in FIG. 4 sends the message to the C-IES. The UnifiedXML interchange gets the message through MEGACO. MEGACO submits the message to the switching fabric 86. The message is sent by the C-IES 51 1 from one of the protocol gateways 74. The message is sent as a data 92 message. It is channeled through the SS7 100 or IP 104 port 106. The message is routed to the carrier gatekeeper 120 as illustrated in FIG. 10. The gatekeeper retrieves the message and interprets it as a server a method called obtainInterface( ) on the Carrier FAI. It does not query the SCP at this time. The gatekeeper returns with the handle to the FSD. On the reverse side, the handle is received by the IP protocol gateway 104. The handle is submitted to the switching fabric 86 which determines that the handle to be delivered via MEGACO to the Parlay gateway 76. The message is retrieved. The FSM is updated with the state, context and the session variables. The message is passed on from the NCES to the client application interface or a driver on the client computer 18.

Step 2: Assuming the service type is not known at the application client 18, a method on the Parlay Gateway 76 called acs_listServiceTypes( ) is invoked. This request is routed through the NCES to the carrier. The method invokes a service on the FAI called listServiceTypes( ) which returns with the type of service. The service type can be a standard name or non-standard name. This is similar to services available on a traditional client/server environment (e.g., /etc/services directory on computers running UNIX) and some Microsoft Windows operating environment identifies all the services that the said computer is operating with. The names of these services and ports are generally standard names and numbers although they can be non-standard in a closed environment as well. This function returns with various service types for example: "E800", "CFWW", "MPCC" etc. If the service is standard, the caller (i.e. client program) can identify that the service type "E800" relates to the Enhanced 800 service where the Carrier switch returns with the enhanced 800 translation.

Step 3: The Parlay Gateway is asked by the application to describe the properties of the service of interest—in this case "E800". It invokes a method on the Parlay Gateway on the NCES called acs_describeServiceType( ). The Parlay Gateway submits this to the Carrier switch and awaits a response asynchronously with the properties of the service. The carrier returns with the description of the service "E800". This includes: (a) the carrier provided description of the service, (b) the property names and value pair, (c) the mode of each name and value pair—mode refers to whether the variable is mandatory when requested i.e. "not-null" or is it read-only and (d) the names of its super types and whether the type is enabled or disabled.

Step 4: In this step the NCES requests for the "E800" service type from the carrier switch. To invoke the client submits a acs_discoverService( ) request to the Parlay Gateway. The gateway submit the disoverService( ) request to the carrier switch with appropriate inbound variables for the requested service. The intent of tuning the variables is to customize the service for the client's specific needs. Upon finding a match, the carrier returns with the ServiceID of the "E800" service in this case. In some cases it is possible for the discoverService( ) request to return more than one service. This is because the carrier switch may identify more than one service to deliver the application requirements. It therefore returns with a list of serviceIDs with a list of service Properties that meet the requirements of the client's request. This process is very similar to the existing client/server paradigm under OSF DCE, CORBA or J2EE where more than one "handle" to the interface or method may be returned depending upon different criteria—for example if a specific interface method is "more busy" than the other then to offer inherent load balancing, either one or a list of more than one appropriate handles is returned which can be used by the application in a round-robin algorithm, First-in-first-out or any other mechanism.

Step 5: to maintain a live connection with the network resources, the client may issue a method pulse( ) in the interface acs_IpAppHeartBeat. The carrier framework uses this method to send as the name suggests it's heartbeat to the requesting client application.

If the pulse( ) is not received then the client can consider framework to be unavailable due to perhaps a hiccup. If too many pulse( ) are not responded then the client can deem the framework to be not available resulting in graceful disconnection from the server. If the framework is to be re-initialized by the client in a new session after a failed heartbeat, the client can invoke a method acs_enableHeartBeat( ) by invoking the specified interface acs_IpHeartBeatMgmt.

Step 6: After the discovery of the service is completed by the enterprise application or an operator, it can find out the list of services that are subscribed by the enterprise. It issues the acs_listSubscribedServices( ) command to the operator via the Parlay Gateway.

Step 7: Requests the translation of the number through E800 service. In this specific case the implementation of the service is unknown. For the sake of an example, a request is made to acs_IpAppLogic interface to translate the call. This invokes the IpAppLogic interface on the switch to translate the number. After the number translation is received the application is responsible for initiating the dialing of the number through the switch.

Step 8: To translate a number, the generic call control capability needs to be accessed by the client. It makes an optional request to the acs_IpAppCallControlManager interface to detect new notifications relevant to the call.

The Parlay Gateway in the NCES invokes the IpAppCallControlManager to define events.

Step 9: The "translate number command within the acs_IpAppLogic interface translates the number.

Step 10: A call is made by method acs_routeReq( ) in the method acs_ipCall based upon the returned number in step 9 above. The Parlay Gateway translates the request to routeReq( ) in the interface ipCall.

At this time in the application scenario depicted in FIG. 10, a call is being attempted to the Customer Service Support center. However it has not been answered or is in the queue. The SR needs to wait until the time that a technical support person comes in person—as instructed by the customer. Upon finding a live technical support personnel, the SR discusses the problem with the technical support rep and instructs the SCS application to send the customer specific records to the technical support rep. The rep gets an automated email from Microsoft exchange. This is accomplished as follows:

Step 1: The SCS application, instructs the FSM 56 in figure e4 of the new state. The FSM identifies the State, Context and Session variables and transitions to the next state. The next state warrants an email to be sent based upon the state, context and session variables. It accesses the customer records from the Oracle database 14 through JDBC, composes an email message with the appropriate customer records information, and sends a javamail or sendmail message to the SMTP server which is "contained" within the Email server 16*b*. The intelligence and the mechanism to connect to the Oracle database such as the IP address, the database name, the connection id, the protocol and other information is contained within the application intelligence that is part of the FSM template. The step results in an email message to be sent to the technical rep who is on the phone who starts reviewing the records.

Step 12: At this stage, as instructed by the customer, a customer needs to be brought in to the call. It repeats step 9 and Step 10.

Step 13: Consider a situation where the call does not get answered. In this case the second party is not connected. The SCS disconnects the call and pulls the customer contact information from the Oracle database which has customer contact information. The FSM changes the state of the transaction. This state warrants an SMS message to be sent. The FSM instructs the UnifiedXML controller through the Media manager to send an SMS message. The UnifiedXML controller 68, based upon the device signature composes the message in specific XML format. In the case of an SMS, a message is sent through the SMS gateway via IP protocol gateway 104. The SMS message probably suggests in less than 100 characters that the Company X rep is on stand by and another attempt will be made in 1 minute. Generally, at this time the customer may be given the option to call the said number in the SMS message. In any case the SCS will make another attempt in 1 minute in this case.

Step 14: An acs_routeReq( )method is initiated by the FSM through the C-IES to the Carrier Framework on the IpCall interface. The framework Step 15: A route response acs_routeRes( ) is received by the client regarding the status of the call.

Step 16: coming back to our scenario, if the customer is available, then he/she receives the connection and the routeRes( ) is said to be connected Step 17: At this time if the SCS application is not interested in retaining the control of the call it will de-assign the call via acs_deassignCall( ) that will result in the Parlay GW to relinquish the connection through deassignCall( ).

Step 18: Although the application ma relinquish the control of the call, it still wants to maintain the connection with the databases as one of the requirements of the customer is to receive the resolution of the previous trouble ticket and an email with the license key of the product. The FSM transitions into new state. This new state warrants connectivity with the Peoplesoft Vantive help desk. AS opposed to connecting directly with the database, it needs to interact via Application APIs.

Step 19: during the development process of the said application (SCS) the developer would have integrated with the Application Programming Interface of Peoplesoft Vantive Help desk application. Also, the current state of the FSM is cognizant of the context variables, state and the session resulting in an appropriate query to be made via the Peoplesoft Vantive APIs to the Vantive application. The results of the inquiry are retrieved.

Step 20: The FSM moves to the next state.

In this state, the help desk trouble ticket resolution from the customer's former inquiry has retrieved a result of the resolution of customer's problem that he had reported a year ago. An email is composed via the Unified XML controller and sent via the IP port with accompanying data to the customer with a copy to the technical support personnel.

Step 21: The only things remaining is an inquiry into the inventory database to send the inventory of the available parts that meet the customer's needs. The FSM transitions to another state resulting in an inquiry to the inventory database on Oracle. A physical SQL query is made into the database that looks like:

SELECT INV_NUM, PART_NAME, QUANTITY, PRICE, SHIPPING_TIME FROM PARTS_INVENTORY WHERE PART_NUM="AG34003450"

This result in a record set to be retrieved. The UnifiedXML controller 68 in conjunction with the Media Manager 64 translates the record set into XML that is compatible with the user's device. If the User is carrying a PocketPC then the XML is xHTML for the pocket PC etc. It creates the output and sends it to the UnifiedXML interchange which instructs it via the switching fabric to switch the session for the user to the data session. A message get sent from the IP port 104 to the device. If the device is push enabled, the message pops on the customer's wireless device allowing the user to visually see the inventory and pricing. The customer makes a decision and places the order.

Although described in this invention is the mechanism to invoke calls over Parlay, JAIN covered under the OSA API, a similar mechanism may be innvoked to support SIP API.

In general, the client-side application sends a request to the NCES via any of the available communication protocols such as: IPC (Inter process Communication), POSIX or Non-POSIX compliant threads, TCP/IP TLI Sockets (Transport Layer Interface), CORBA IIOP if using CORBA (Common Object Request Broker Architecture), DCE RPC (Distributed Computing Environment Remote Procedure Call), Java JMX (Java Message Exchange), Microsoft MSM (Message Queue), IBM MQ series; XDR RPC or any other distributed computing methodology.

Since other combinations, modifications and changes varied to fit particular operating requirements and environments will be apparent to those skilled in the art, the invention is not considered limited to the chosen preferred embodiments for purposes of this disclosure, but covers all changes and modifications which do not constitute departures from the true spirit and scope of this invention.

Having thus described the invention, what is desired to be protected by Letters Patent is presented in the subsequently appended claims.

What is claimed is:

1. A method for converging a carrier network and a packet network, the steps comprising:
   a) enhancing a carrier network by operatively and directly connecting a first carrier-side integrated edge switch (C-IES) thereto;
   b) creating a new packet network comprising a first softswitch (SS) adapted for communication with said first C-IES, said new packet network further comprising a second C-IES operatively connected to said first SS;
   c) operatively connecting a programmable network convergence edge-switch (NCES) and a private-side integrated edge switch (P-IES) to a second packet network; and
   d) interconnecting said second C-IES and said P-IES;
whereby at least one of data, applications, and data-oriented services within said data network receive access to devices within said second packet network.

2. The method for converging a carrier network and a packet network as recited in claim 1, wherein said new packet network further comprises at least one of the devices: at least one additional softswitch (SS), a session initiation protocol (SIP) switch, and an SS7/AIN interface, operatively connected to at least one of said first SS and said second C-IES.

3. The method for converging a carrier network and a packet network as recited in claim 1, wherein said carrier network comprises a public switched telephone network (PSTN).

4. A method for converging a carrier network and a packet network, the steps comprising:
   a) enhancing a carrier network by operatively and directly connecting a softswitch (SS) thereto;
   b) operatively and directly connecting a programmable network convergence edge-switch (NCES) and a private-side integrated edge switch (P-IES) to a packet network;
   c) operatively connecting a private-side integrated edge switch enterprise softswitch (P-IES Enterprise SS) to said P-IES; and
   d) interconnecting said P-IES Enterprise SS and said carrier SS whereby at least one of data, applications, and data-oriented services within said data network receives access to devices within said packet network.

5. The method for converging a carrier network and a packet network as recited in claim 4, wherein said carrier network comprises a public switched telephone network (PSTN).

6. A method for converging a carrier network and a packet network, the steps comprising:
   a) enhancing a carrier network by operatively and directly connecting a JAIN/Parlay server thereto;
   b) operatively and directly connecting a programmable network convergence edge-switch (NCES) and a private-side integrated edge switch (P-IES) to a packet network;
   c) operatively and directly connecting a private-side integrated edge switch GAIN gateway to said P-IES;
   d) operatively and directly connecting a JAIN/Parlay client device to said private-side integrated edge switch GAIN gateway; and
   e) interconnecting said JAIN/Parlay server and said JAIN/Parlay client device whereby at least one of data, applications, and data-oriented services within said data network receives access to devices within said packet network.

7. The method for converging a carrier network and a packet network as recited in claim 6, wherein said carrier network comprises a public switched telephone network (PSTN).

8. A method for converging a carrier network and a packet network, the steps comprising:
   a) enhancing a carrier network by operatively connecting a SIP switch directly thereto;
   b) operatively connecting a programmable network convergence edge-switch (NCES) and a private-side integrated edge switch (P-IES) to a packet network;
   c) operatively connecting a private-side integrated edge switch SIP proxy device to said P-IES;
   d) interconnecting said SIP switch and said SIP proxy device whereby at least one of data, applications, and data-oriented services within said data network receives access to devices within said packet network.

9. The method for converging a carrier network and a packet network as recited in claim 8, wherein said carrier network comprises a public switched telephone network (PSTN).

10. An architecture for converging voice and data networks, comprising:
    a) a packet network comprising a carrier-side integrated edge switch associated with and operatively and directly connected to a network; and
    b) a private-side integrated edge switch associated with and operatively connected to a data network having a programmable network convergence edge-switch (NCES), said private-side integrated edge switch being operatively connected to said carrier-side integrated edge switch;
whereby at least one of data, applications, and data-oriented services within said data network receives access to devices within said packet network.

11. The architecture for converging voice and data networks as recited in claim 10, wherein said network is a public network.

12. The architecture for converging voice and data networks as recited in claim 10, wherein said packet network further comprises at least one of the devices: a softswitch (SS), a session initiation protocol (SIP) switch, and an SS7/AIN interface.

* * * * *